United States Patent [19]

Macdonald

[11] 4,275,934

[45] Jun. 30, 1981

[54] ANTI-LOCK BRAKE DEVICES

[76] Inventor: Douglas J. L. Macdonald, Lot 1157, Clear Water Bay Rd., New Territories, Hong Kong

[21] Appl. No.: 970,930

[22] Filed: Dec. 19, 1978

[30] Foreign Application Priority Data

Dec. 21, 1977 [GB] United Kingdom ............... 53216/77

[51] Int. Cl.³ ............................................. B60T 13/68
[52] U.S. Cl. .................................. 303/119; 251/139; 251/324; 251/333
[58] Field of Search ............... 303/119, 113, 118, 117, 303/115; 251/139, 141, 324, 333

[56] References Cited

U.S. PATENT DOCUMENTS

| 3,610,701 | 10/1971 | Riordan | 303/115 |
| 3,727,629 | 4/1973 | Gifford | 251/333 X |
| 3,902,663 | 9/1975 | Elmer | 251/324 |

FOREIGN PATENT DOCUMENTS

| 1031414 | 6/1966 | United Kingdom . |
| 1300921 | 12/1972 | United Kingdom ..................... 303/119 |
| 1412038 | 10/1975 | United Kingdom . |

Primary Examiner—J. D. Miller
Assistant Examiner—Reinhard J. Eisenzopf
Attorney, Agent, or Firm—Bacon & Thomas

[57] ABSTRACT

An anti-lock brake device comprises a cylinder adapted to be installed in a pipeline connecting a master cylinder with one or more wheel cylinders of a vehicle. A solenoid-actuated operating member is slidable in the cylinder and is positionable to prevent fluid flow through the device. The operating member is biased into a position in which fluid flow is permitted, energization of the solenoid causing the operating member to prevent fluid flow and, by volume displacement of at least part of the operating member to reduce the fluid pressure on the wheel cylinder side of the device.

7 Claims, 4 Drawing Figures

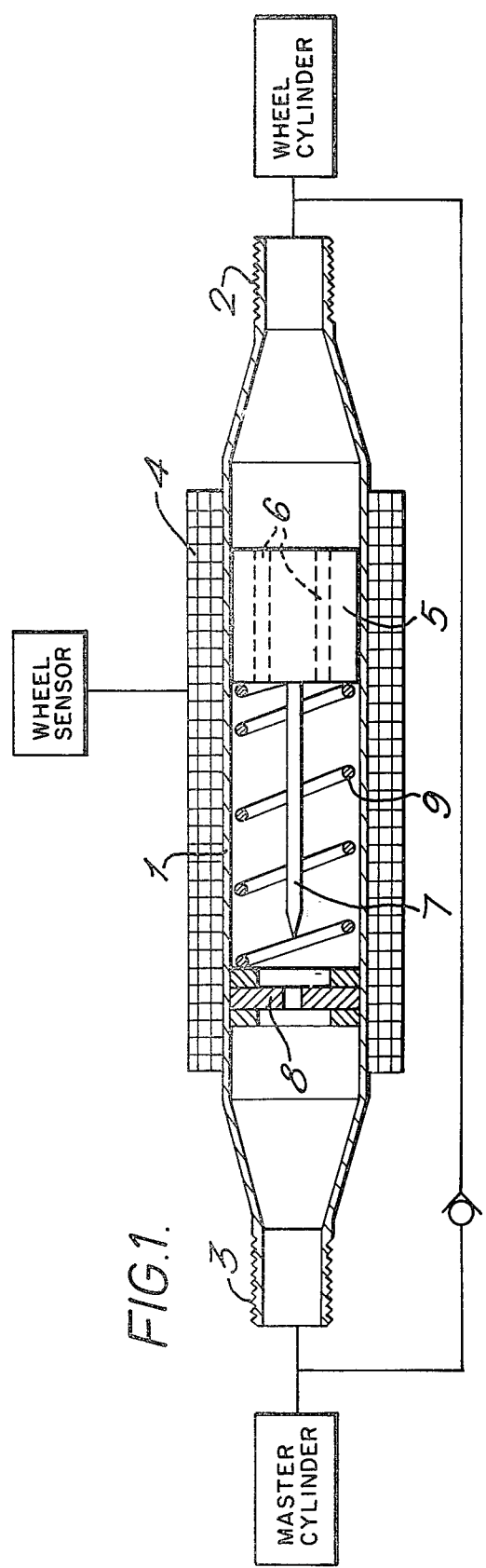
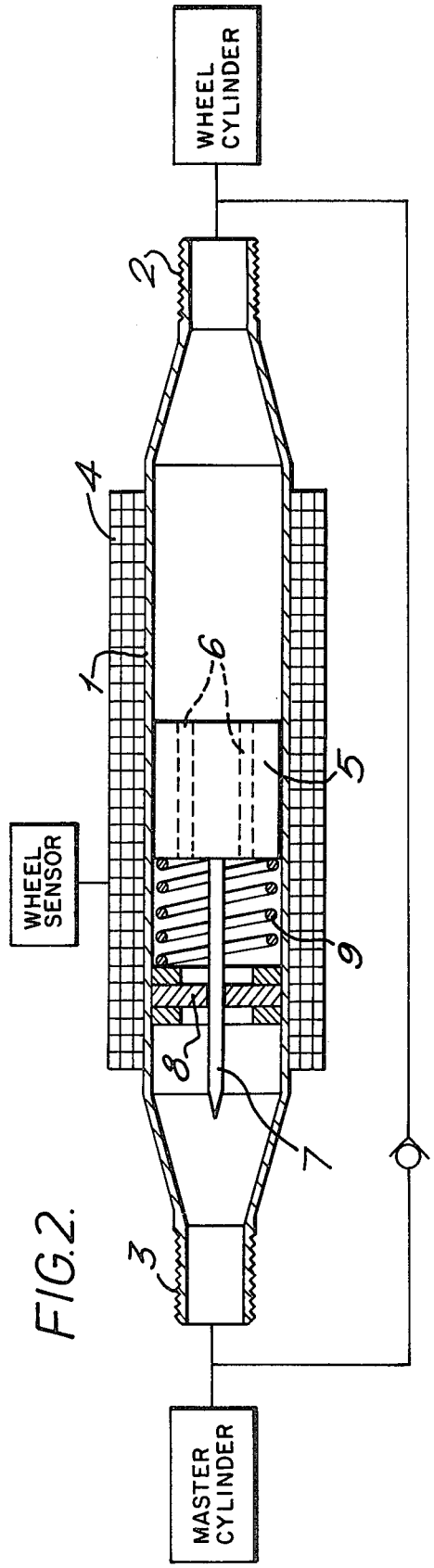

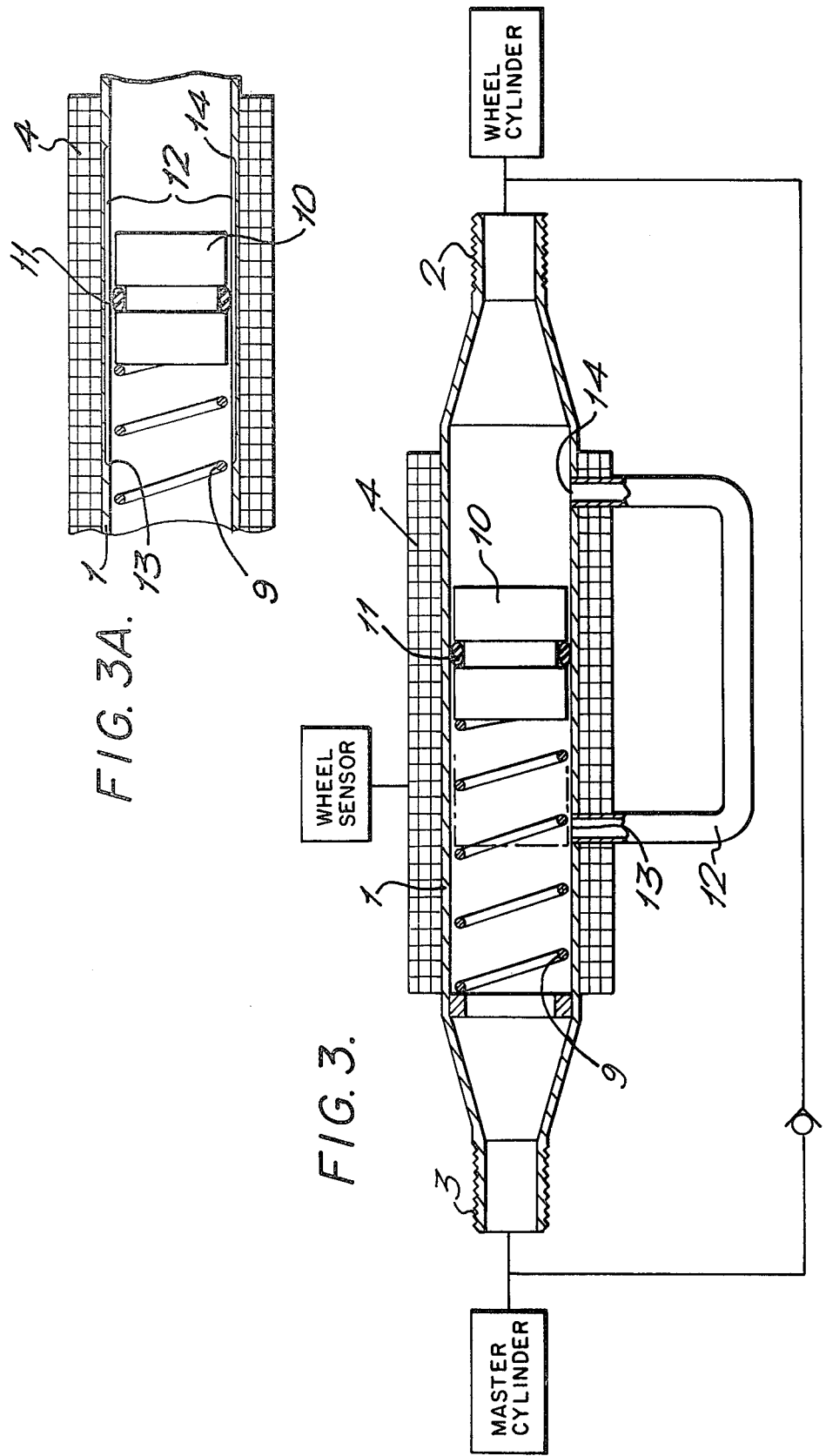

ANTI-LOCK BRAKE DEVICES

The present invention relates to an anti-lock brake device for use in pneumatic or hydraulic brake systems.

In the braking system of motor cars, it is usual to fit a pressure valve which limits the pressure which can be applied to the rear braking circuit. However, such a valve must clearly allow sufficient pressure to be applied to the rear brakes to allow rapid braking under ideal conditions. It follows that, under less than ideal conditions, such a valve will allow locking up of the rear wheels, or conversely insufficient braking effect from them.

This problem is even greater for trucks, buses and semi-trailers, whether or not air brakes are used.

According to the invention, there is provided an anti-lock brake device for use in a braking system of a vehicle, comprising a cylinder adapted to be installed in a pipeline connecting a master cylinder with one or more wheel cylinders, a solenoid-actuated operating member slidable in said cylinder and positionable to prevent fluid flow through the device, and means biasing said operating member to a position in which such fluid flow is permitted, energisation of the solenoid causing movement of the operating member against the biasing means so as to prevent said fluid flow and, as a result of volume displacement of the operating member or a part thereof, to cause the fluid pressure on the wheel cylinder side of the device to be reduced.

In a preferred embodiment, the operating member allows fluid flow through the cylinder, and the operating member includes an elongate valve member which extends longitudinally of the cylinder, an apertured wall extends across the cylinder and is adapted to co-operate with said elongate valve member to prevent fluid flow through the cylinder, the arrangement being such that, when the solenoid is energised, the operating member is driven towards the apertured wall and the elongate valve member is driven through the aperture.

The elongate valve member is preferably tapered at its leading end so as to facilitate its engagement with the apertured wall. The apertured wall may comprise an O-ring mounted in the cylinder.

When the device is installed in a pipeline connecting the master cylinder with one or more wheel cylinders, with the operating member closer to the wheel cylinder end of the cylinder than the sealing member, and the solenoid coil is energised, the elongate valve member first contacts the sealing member, at which point further fluid flow through the cylinder is substantially prevented, and then continues to pass through the apertured wall, thus increasing the pressure in the fluid between the wall and the master cylinder and decreasing the fluid pressure between the wall and said one or more wheel cylinders, by valve member volume displacement. Thus, if the solenoid is actuated by an electrical signal when the wheel or one of the wheels associated with said device ceases to rotate, the reduction in pressure referred to above will cause the or each wheel cylinder to unlock the brake associated with that wheel. The solenoid will then of course, be de-activated, and the biasing means will force the operating member away from the sealing member and the elongate valve member out of engagement with the sealing member. It is possible during this de-activation operation that the pressure between the apertured wall and the wheel cylinder or cylinders will become greater than the pressure between the apertured wall and the master cylinder. In order to avoid this, it may be desirable to provide a check valve which allows equalisation in pressure by flow towards the master cylinder. Such a check valve could be provided within the cylinder, for example in a seal housing holding the apertured wall, or in a by-pass.

The operating member is preferably provided with one or more grooves and/or one or more apertures extending the entire axial length thereof in order to allow the said fluid flow through the cylinder.

In another preferred embodiment, the operating member comprises a piston which seals directly to the cylinder wall or has a sealing member mounted thereon, the sealing member being in contact with the cylinder so as to prevent fluid flow through the cylinder. By-pass means are provided so as to permit fluid flow past the piston when the solenoid is not actuated.

In normal use of this embodiment, fluid flow through the cylinder is prevented by the piston and seal arrangement, and fluid flow towards and away from the wheel cylinders occurs through the by-pass means.

However, when the solenoid is energised, the piston, with the seal thereon, moves along the cylinder, and when the seal passes the end of the by-pass means, further fluid flow through the device is prevented. Then, as the piston continues to move towards the master cylinder, pressure is steadily reduced until the brake is unlocked. The solenoid will then be de-activated, and the piston will be returned by the return spring to the position in which it is by-passed. If, of course, locking-up reoccurs, the device will be reactuated and the cycle described above will be repeated, until the conditions causing locking no longer exist.

One or more seals can be mounted on the piston as desired. The sealing member preferably comprises an O-ring. The by-pass means preferably comprises a conduit, at least one end of which is connected to the cylinder. Alternatively, the by-pass means could take the form of one or more grooves in the wall of the cylinder.

The anti-lock brake device is desirably arranged so that it operates as rapidly as possible when the solenoid is energised. However, it is also desirable to control the rate of return of the piston, so that the wheel cylinder or cylinders receive a steadily increasing pressure when the solenoid is deactivated. This can be achieved by selecting the strength of a return spring used as the biasing means, the fluid pressure resistance of the operating member, the diameter of the valve member and the pressure valve member. A multi-rate return spring could be used to give similar return characteristics, regardless of the line pressure.

Although it is preferred to install an antilock brake device according to the invention in the pipeline leading to each wheel cylinder, a more economical, but somewhat less efficient, system could utilise a single device in the rear brake circuit or two devices, one in the front brake circuit and one in the rear brake circuit.

The solenoid coil may be actuated by any known means for sensing that a wheel is stationary. Thus, for example, a speedometer drive cable driven by a wheel may be connected to a centifugal switch which is connected in a circuit with the solenoid coil. The switch is switched ON when the cable is stationary, thus completing the circuit and energising the solenoid.

More complex sensing systems could alternatively be provided, for example those which compare vehicle speed and the rotational speed of a wheel. These are capable of producing a signal when wheel slippage, rather than wheel locking occurs.

The device may be used in braking systems using a hydraulic brake fluid or in air braking systems.

In the accompanying drawings:

FIG. 1 is a cross-section through a first embodiment of an anti-lock brake device according to the invention;

FIG. 2 shows the device of FIG. 1 when the solenoid is energised; and

FIG. 3 is a cross-section through a second embodiment of an anti-lock brake device according to the invention.

FIG. 3A is a partial cross-section of a modification of the second embodiment of FIG. 3.

The device shown in FIGS. 1 and 2 comprises a cylinder 1 having at one end thereof a threaded portion 2 adapted to be secured to a pipeline leading to one or more wheel cylinders of a braking system of a vehicle. A threaded portion 3 at the other end of the cylinder is adapted to be secured to a pipeline leading to a master cylinder of the braking system. A solenoid 4 surrounds the cylinder 1. An operating member 5 is movable axially in the cylinder and has a plurality of apertures 6 extending therethrough, so as to allow fluid flow through the cylinder. The operating member comprises a needle valve member 7 which extends axially along the cylinder. An apertured wall 8 is mounted in the cylinder and co-operates with the needle valve member 7 to prevent fluid flow through the cylinder when the solenoid 4 is energised, as shown in FIG. 2. A return spring 9 biases the operating member 5 away from the apertured wall 8.

The device operates as follows. When the braking system is operating normally, the operating member 5 remains in the position shown in FIG. 1, thus allowing brake fluid to flow in either direction through the cylinder 1. When the solenoid 4 is energised in response to the wheel or one of the wheels with which the device is associated being locked, the operating member is moved leftwardly as shown in FIG. 2.

After the tapered end portion of the needle member 7 has passed through the apertured wall 8, further fluid flow through the cylinder is prevented. Then, as the needle member 7 continues to move leftwardly, the pressure to the right hand side of the apertured wall 8 is reduced, thus reducing the force on the or each wheel cylinder, whereby the brake is unlocked and the wheel can once again rotate. The solenoid will then be de-energised, and the operating member 5 will commence to travel rightwardly (as seen in the drawings) at a rate determined by the various factors described above, whereby a steadily increasing fluid pressure is applied to the or each wheel cylinder. If the conditions which caused the brake to lock still persist, the solenoid will, of course, be re-activated, and the cycle described above will be repeated. During the period for which the needle member extends through the apertured wall, the fluid pressure between the apertured wall and the master cylinder will, of course, be increased, so that a greater braking pressure will be applied to the wheels with which the device is not associated, and the driver will detect a pedal response to a momentarily locked wheel.

As shown in FIGS. 3 and 3A, a second embodiment of the invention also comprises a cylinder 1 having threaded portions 2, 3, the cylinder being surrounded by a solenoid coil 4. However, the operating member is in the form of a piston 10 which does not have any apertures therethrough and is sealed to the wall of the cylinder by an O-ring 11 fitted to the piston 10 so as to prevent fluid flow through the cylinder 1. A by-pass 12 is provided to connect a point 13 intermediate the ends of the cylinder to a point 14 between the position occupied by the piston 10 when the solenoid is not actuated (shown in FIGS. 3 and 3A) and the wheel cylinder. A return spring 9 biases the piston into the illustrated position.

The device operates as follows. In the position shown in the Figures in which the solenoid is not actuated, brake fluid can flow in either direction through the by-pass 12. The braking system can thus operate normally. When the solenoid 4 is energised, the piston 10, together with the seal 11 is moved leftwardly. As soon as the seal 11 has moved past the entrance 13 to the by-pass 12, further fluid flow through the device is prevented. Then, as the piston 10 continues to move leftwardly, the pressure on the right hand side of the piston is reduced, thus reducing the force applied to the or each wheel cylinder, whereby the brake is unlocked and the wheel can once again rotate. In other respects, the operation of this embodiment of the invention will be the same as that of the first embodiment.

It will thus be seen that the invention, at least in its preferred embodiment, provides a device capable of preventing wheel locking under varying conditions of use which at the same time, is simple and hence inexpensive.

I claim:

1. An anti-lock brake device for use in a braking system of a vehicle, comprising a cylinder adapted to be installed in a pipeline connecting a master cylinder with one or more wheel cylinders, a solenoid-actuated operating member slidable in said cylinder and positionable to act as a valve member to prevent fluid flow through the device, means biasing said operating member to a position in which such fluid flow is permitted, energization of the solenoid causing movement of the operating member against the biasing means so as to prevent said fluid flow and, as a result of volume displacement of at least a part of the operating member, to cause the fluid pressure on the wheel cylinder side of the device to be reduced, and a check valve adapted to allow equalization of pressure across said device by fluid flow towards the master cylinder.

2. A device as claimed in claim 1, wherein the operating member includes an elongate valve member extending longitudinally of the operating member, and an apertured wall extends across the cylinder so as to be between the operating member and the master cylinder in use when the solenoid is not energised, energisation of the solenoid causing the operating member to be moved towards the said wall and the elongate valve member to extend through the aperture therein so as to prevent said fluid flow and, by movement through the aperture, to cause said reduction in fluid pressure on the wheel cylinder side of the wall.

3. A device as claimed in claim 2, wherein the said valve member is carried by the operating member which has a cylinder element portion slidable in the cylinder and is formed to permit fluid flow past it.

4. A device as claimed in claim 1, wherein the said operating member is a piston closing the cylinder and there is a by-pass passage permitting fluid flow around said piston, energisation of the solenoid causing movement of the piston to close off the by-pass passage and, by movement of the piston in the cylinder, to cause said reduction in fluid pressure on the wheel cylinder side of the piston.

5. A device as claimed in claim 4, wherein the by-pass passage comprises a conduit external of the cylinder.

6. A device as claimed in claim 4, wherein the by-pass passage comprises at least one groove in the wall of the cylinder.

7. An anti-lock brake system comprising an anti-lock brake device as claimed in any of one of claims 1-6 arranged in a pipe-line connecting a master cylinder with one or more wheel cylinders, and further comprising sensing means adapted to supply an electric current to said solenoid when a wheel or one of the wheels with which said device is associated ceases to rotate, or is about to cease rotation.

* * * * *